United States Patent [19]

Takanashi et al.

[11] Patent Number: 4,757,377
[45] Date of Patent: Jul. 12, 1988

[54] COLOR TELEVISION IMAGE PICKUP DEVICE WITH A STRIPE FILTER PARALLEL TO SCANNING DIRECTION

[75] Inventors: Itsuo Takanashi, Kamakura; Shintaro Nakagaki, Fujisawa; Hiroshi Ichimura; Takashi Kuriyama, both of Tokyo; Tsutou Asakura, Yokohama; Hiroki Kitamura, Tokyo, all of Japan

[73] Assignee: Victor Company of Japan, Ltd., Japan

[21] Appl. No.: 889,687

[22] Filed: Jul. 23, 1986

[30] Foreign Application Priority Data

Jul. 27, 1985 [JP] Japan ................................ 60-166195
Jul. 27, 1985 [JP] Japan ................................ 60-166196

[51] Int. Cl.[4] .......................... H04N 9/083; H04N 9/07
[52] U.S. Cl. ........................................ 358/47; 358/44; 358/55
[58] Field of Search ...................... 358/41, 43, 44, 909, 358/45, 46, 47, 68, 55, 75

[56] References Cited

U.S. PATENT DOCUMENTS

| | | |
|---|---|---|
| 3,558,807 | 1/1971 | Kurokawa . |
| 3,763,480 | 10/1973 | Weimer ............................. 340/173 R |
| 3,846,579 | 11/1974 | Takanashi et al. ...................... 358/47 |
| 3,858,079 | 12/1974 | Miyama et al. ......................... 358/47 |
| 4,041,528 | 8/1977 | Miyoshi et al. ......................... 358/47 |
| 4,277,800 | 7/1981 | Nakagaki et al. ....................... 358/44 |
| 4,318,123 | 3/1982 | Knop ..................................... 358/43 |
| 4,546,380 | 10/1985 | Knop ..................................... 358/44 |
| 4,578,699 | 3/1986 | Takanashi et al. ...................... 358/44 |
| 4,614,966 | 9/1986 | Yunoki et al. .......................... 358/44 |

FOREIGN PATENT DOCUMENTS

820053 9/1959 United Kingdom .
1092881 11/1967 United Kingdom .
1438071 6/1976 United Kingdom .

OTHER PUBLICATIONS

"The Magnavox Comb Filter", Apr. 1979.

Primary Examiner—James J. Groody
Assistant Examiner—Robert M. Bauer
Attorney, Agent, or Firm—Andrus, Sceales, Starke & Sawall

[57] ABSTRACT

A color image pickup device comprises an image pickup tube, a color stripe filter comprising a plurality of stripes, a circuit for obtaining a color multiplexed signal by sampling color information from the color stripe filter and multiplexing color components obtained by the sampling in a direction perpendicular to the scanning direction, and a circuit for producing a color demodulated signal by subjecting the color multiplexed signal to a color demodulation. The color stripe filter may be arranged on the image pickup tube so that a longitudinal direction of the stripes is approximately parallel to a scanning direction of the image pickup tube, and the sampling may be performed at sampling points which are deviated in the scanning direction for each scanning line. On the other hand, the color stripe filter may be arranged so that the scanning direction is inclined by a certain angle with respect to the longitudinal direction of the stripes so that an interval between two mutually adjacent sampling points on each scanning line along a direction approximately perpendicular to the scanning direction is within a repetition pitch of the scanning lines.

4 Claims, 5 Drawing Sheets

COLOR TELEVISION IMAGE PICKUP DEVICE WITH A STRIPE FILTER PARALLEL TO SCANNING DIRECTION

BACKGROUND OF THE INVENTION

The present invention generally relates to color image pickup devices, and more particularly to a color image pickup device which obtains a color multiplexed signal from a pickup tube provided with a color stripe filter and performs a color demodulation in a single tube color television camera, for example.

In a conventional single tube color television camera, a color multiplexed signal is obtained by performing a scan in a direction perpendicular to the longitudinal direction of stripes of a color stripe filter which comprises a repetition of green (G), cyan (C) and white (W or transparent) stripes.

However, because the scanning is performed in the direction perpendicular to the longitudinal direction of the stripes of the color stripe filter, color components obtained via the color stripe filter are multiplexed by a carrier of 4 MHz which is relatively high for one period of the color stripe filter (that is, for one group of the G, C and W stripes). Generally, noise is high in the high frequency range, and the degree of modulation of the image pickup tube is low in the high frequency range. As a result, the signal-to-noise ratio becomes poor. In addition, the image pickup tube cannot reproduce color stripes with a high fidelity, and there is a problem in that the color reproducibility is poor.

Furthermore, since the scanning is performed in the direction perpendicular to the longitudinal direction of the stripes of the color stripe filter, the color components obtained via the color stripe filter are multiplexed in a sequence corresponding to the scanning direction. For this reason, the frequency band of the luminance signal becomes limited to a narrow frequency band by the color multiplexed signal (carrier), and there is a problem in that it is impossible to obtain a satisfactory horizontal resolution.

SUMMARY OF THE INVENTION

Accordingly, it is a general object of the present invention to provide a novel and useful color image pickup device in which the problems described heretofore are eliminated.

Another and more specific object of the present invention is to provide a color image pickup device in which color components are multiplexed by a carrier having a relatively low carrier frequency. According to the color image pickup device of the present invention, it is possible to obtain a high signal-to-noise ratio and to obtain a satisfactory color reproducibility. In addition, it is possible to have a wide frequency band for the luminance signal and to obtain a satisfactory horizontal resolution. Furthermore, it is possible to obtain an accurate color multiplexed signal waveform even when a longitudinal direction of stripes of a color stripe filter is not perfectly parallel to a scanning direction.

Still another object of the present invention is to provide a color image pickup device in which a number of scanning lines required to obtain a certain resolution is reduced compared to a number of scanning lines conventionally required to obtain the certain resolution, and generation of color beat is prevented by eliminating an aliasing distortion introduced by a fundamental wave component of the color stripe filter and sampling and eliminating an aliasing distortion introduced by a higher harmonic component and the sampling.

Other objects and further features of the present invention will be apparent from the following detailed description when read in conjunction with the accompanying drawings.

DETAILED DESCRIPTION

Figure 1:
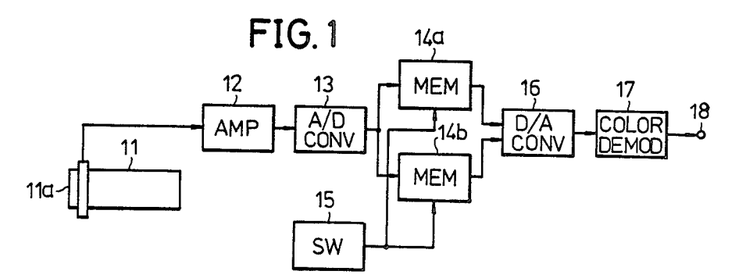
FIG. 1 is a system block diagram showing first and second embodiments of the color image pickup device according to the present invention.
Figure 2:
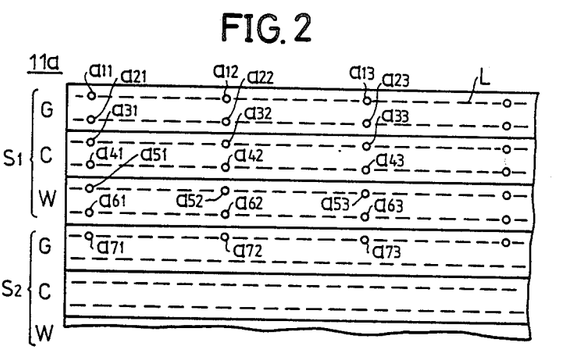
FIG. 2 is a diagram showing a portion of a color stripe filter for explaining a relationship between scanning lines and sampling positions for a case where a scanning direction of an image pickup tube is perfectly parallel to a longitudinal direction of stripes of the color stripe filter.

FIG. 1 shows first and second embodiments of the color image pickup device according to the present invention, and FIG. 2 shows a portion of a color stripe filter used in the present invention for explaining the relationship between scanning lines and sampling positions.

As shown in FIG. 2, a color stripe filter 11a comprises a repetition of green (G), cyan (C) and white (W or transparent) stripes. In the present embodiment, the color image pickup device performs the scanning in a longitudinal direction of the stripes of the color stripe filter 11a. A number of scanning lines L is set to such a number that the color stripe filter 11a can reproduce the samples. For example, the number of scanning lines L for one stripe group consisting of the G, C and W stripes is set to six. According to the energy step system, a fundamental wave component and a second harmonic component are to be reproduced. Thus, it may be understood from the sampling theorem that it is possible to reproduce the fundamental wave component and the second harmonic component when there are four or more scanning lines L per one stripe group.

In FIG. 1, a signal obtained from an image pickup tube 11 which is provided with the color stripe filter 11a shown in FIG. 2 is passed through a preamplifier 12 and is supplied to an analog-to-digital (A/D) converter 13 wherein the signal is converted into a digital signal. The output digital signal of the A/D converter 13 is supplied to field memories 14a and 14b. A control signal is supplied to the memories 14a and 14b from a switching circuit 15 so as to control write-in and read-out operations of the memories 14a and 14b.

Figure 3A:
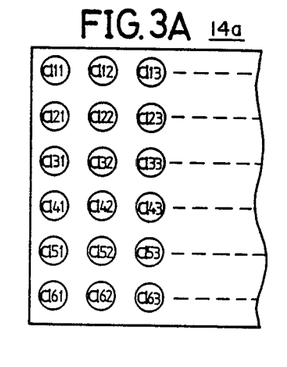
FIGS. 3A and 3B are diagrams for explaining a write-in operation to a memory in the first embodiment.
Figure 3B:
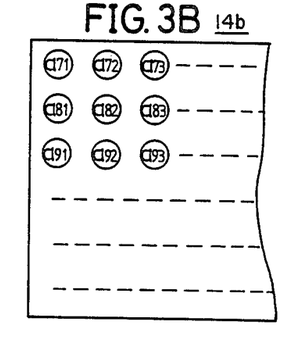

One period of the stripe groups of the color stripe filter 11a is set to correspond to one horizontal scanning period of the NTSC system. In a first horizontal scanning period, a signal from the A/D converter 13 related to a first stripe group S1 is written into the memory 14a as shown in FIG. 3A in a sequence of sampled data at sampling points a11, a12, a13, . . . , a21, a22, a23, . . . , a31, a32, a33, . . . shown in FIG. 2. In other words, the sampled data related to the first stripe group S1 are successively written into the memory 14a in the sequence of the sampled data arranged in the horizontal direction. In a second horizontal scanning period, the stored sampled data related to the first stripe group S1 are successively read out from the memory 14a in a sequence of the sampled data at the sampling points a11, a21, a31, a41, a51, a61, a12, a22, a32, a42, a52, a62, a13, a23, a33, a43, a53, a63, . . . . In other words, the stored sampled data are read out from the memory 14a in the sequence of the stored sampled data arranged in a direction perpendicular to the write-in direction. On the other hand, in the second horizontal scanning period, a signal from the A/D converter 13 related to a second stripe group S2 is written into the memory 14b as shown in FIG. 3B in a sequence of sampled data at sampling points a71, a72, a73, . . . , a81, a82, a83, . . . , a91, a92, a93, . . . , similarly as in the case of the write-in to the memory 14a in the first horizontal scanning period.

In a third horizontal scanning period, the stored sampled data related to the second stripe group S2 are successively read out from the memory 14b in a sequence of the sampled data at the sampling points a71, a81, a91, . . . , a72, a82, a92, . . . , a73, a83, a93, . . . . In other words, the stored sampled data are read out from the memory 14b in the sequence of the stored sampled data arranged in a direction perpendicular to the write-in direction. Furthermore, in this third horizontal scanning period, a signal from the A/D converter 13 related to a third stripe group is newly written into the memory 14a.

Similarly thereafter, the write-in and read-out operations are alternately performed in the memories 14a and 14b for the signal related to each stripe group, and such operations are repeated. As a result, the write-in and read-out operations are performed for each stripe group, that is, for each horizontal scanning period. The signals read out from the memories 14a and 14b for every one horizontal scanning period of the NTSC system are supplied to a digital-to-analog (D/A) converter 16 wherein the signals are converted into an analog signal.

Figure 4:
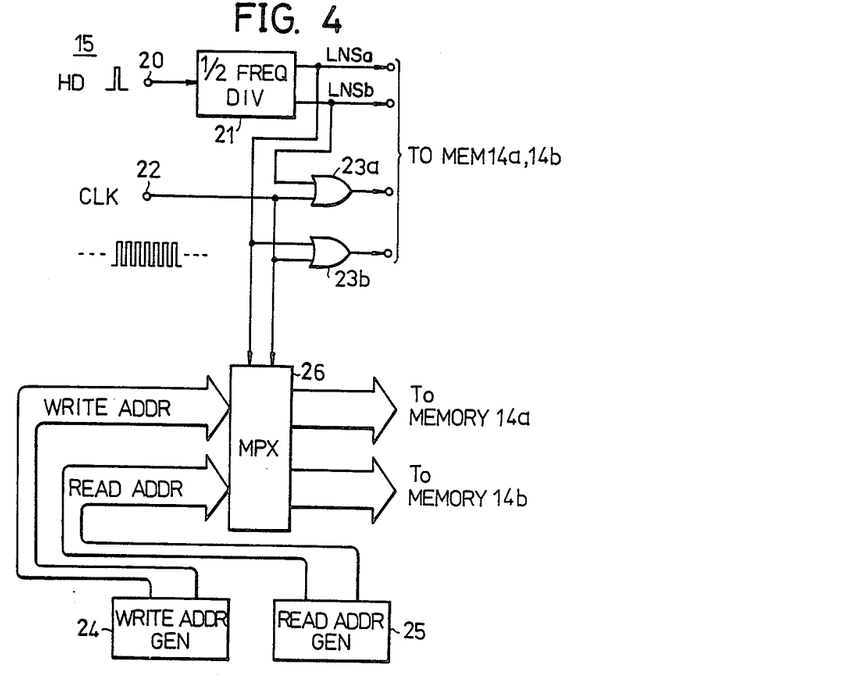
FIG. 4 is a system circuit diagram showing an embodiment of a switching circuit in the color image pickup device according to the present invention.
Figure 5:
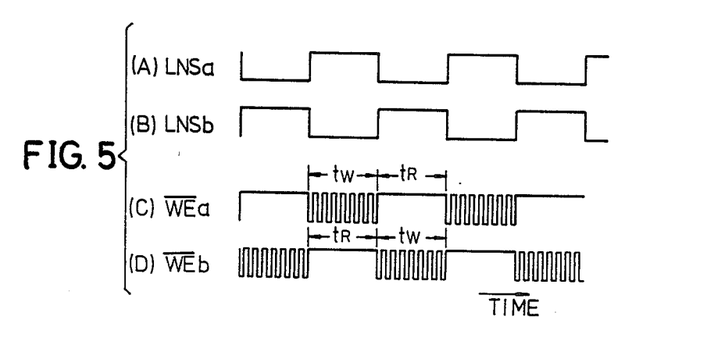
FIGS. 5(A) through 5(D) show signal waveforms for explaining the operation of the switching circuit shown in FIG. 4.

An embodiment of the switching circuit 15 is shown in FIG. 4. In FIG. 4, a horizontal synchronizing signal HD is applied to a terminal 20 and is supplied to a ½ frequency divider 21 wherein the signal is frequency-divided by ½. As a result, signals LNSa and LNSb shown in FIGS. 5(A) and 5(B) are obtained from the frequency divider 21. On the other hand, a clock signal CLK is applied to a terminal 22 and is supplied to OR gates 23a and 23b which are respectively supplied with the signals LNSa and LNSb. Hence, write-in and read-out control signals WEa and WEb shown in FIGS. 5(C) and 5(D) are obtained from the OR gates 23a and 23b.

A write-in address generated by a write-in address generator 24 and a read-out address generated by a read-out address generator 25 are supplied to a multiplexer 26. This multiplexer 26 is also supplied with the output signals LNSa and LNSb of the frequency divider 21. Hence, the multiplexer 26 alternately produces the write-in address and the read-out address with a period of one horizontal scanning period, in synchronism with the timing of the signal LNSa, for example. The output address of the multiplexer 26 is supplied to the memories 14a and 14b.

Accordingly, during a time period $t_W$ shown in FIG. 5(C), for example, the memory 14a performs a write-in operation responsive to the control signal WEa to write data at a write-in address. During a next time period $t_R$ shown in FIG. 5(C), the memory 14a performs a read-out operation responsive to the control signal WEb to read out stored data from a read-out address. The memory 14a alternately performs the write-in operation and the read-out operation for every one horizontal scanning period, and such write-in and read-out operations are repeated. On the other hand, the memory 14b performs the write-in and read-out operations similarly as in the case of the memory 14a, except that the memory 14b performs the read-out operation while the memory 14a performs the write-in operation and performs the write-in operation while the memory 14a performs the read-out operation.

The signals LNSa and LNSb from the frequency divider 21 are also supplied to data latch circuits (not shown) which are respectively provided at input and output stages of the memories 14a and 14b, so as to control the timings of input and output data of the memories 14a and 14b to regular timings.

Figure 6:
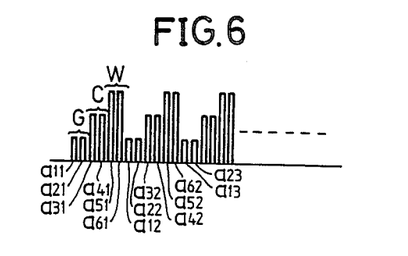
FIG. 6 shows an input signal waveform to a color demodulating circuit in the color image pickup device according to the present invention.

The output signal of the D/A converter 16 comprises the data of each stripe group arranged on the time base as shown in FIG. 6. This signal shown in FIG. 6 is similar to a color multiplexed signal obtained in accordance with the general energy step system. When the sampling theorem is satisfied, the output signal of the D/A converter 16 becomes similar to the color multiplexed signal obtained by multiplexing the color components according to the energy step system, and it is possible to reproduce a fundamental wave component signal and a second harmonic component signal with a high fidelity even when the sampling phase and frequency change.

The output signal of the D/A converter 16 is supplied to a color demodulating circuit 17 which has a construction similar to a color demodulating circuit used in the case of the energy step system, and is subjected to a color demodulation. An output signal of the color demodulating circuit 17 is obtained via an output terminal 18.

According to the present embodiment, the scanning is performed in the longitudinal direction of the stripes of the color stripe filter 11a. For this reason, the color components are multiplexed by a carrier having a frequency of 94.5 kHz (=fundamental wave component frequency of 15.75 kHz×6) which is relatively low for one period (corresponding to one horizontal scanning period of the NTSC system) of the stripe group comprising the G, C and W stripes. As a result, the signal-to-noise ratio is high. In addition, the image pickup tube can reproduce the color stripes with a high fidelity, and the color reproducibility is satisfactory.

Furthermore, since the scanning is performed in the longitudinal direction of the stripes of the color stripe filter 11a, the color components obtained via the color stripe filter 11a are not multiplexed in a sequence corresponding to the horizontal direction (scanning direction). For this reason, it is possible to obtain the same resolution as in the case of a black-and-white picture, and the frequency band of the luminance signal will not be limited by the color multiplexed signal (carrier). The frequency band of the luminance signal can be made wide, and it is possible to obtain a satisfactory horizontal resolution.

Figure 7A:
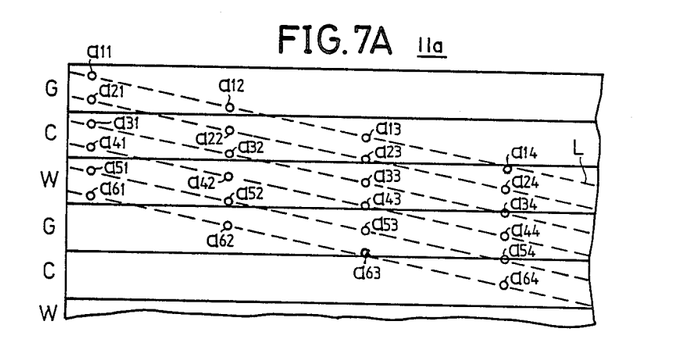
FIGS. 7A and 7B generally show a portion of the color stripe filter used in the first embodiment for explaining a relationship between the scanning lines and the sampling positions for a case where the longitudinal direction of the stripes of the color stripe filter is deviated from the scanning direction.
Figure 7B:
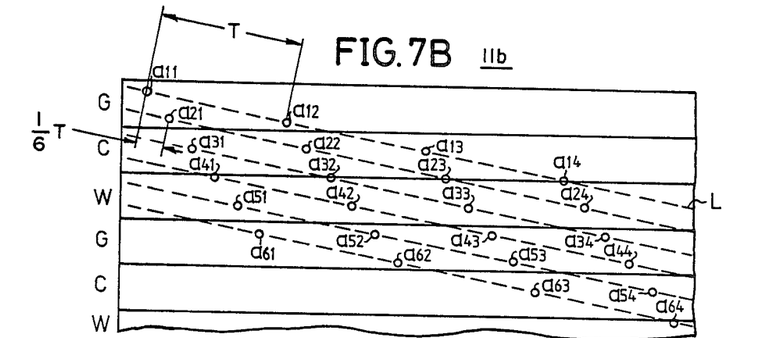

In the case shown in FIG. 2, the scanning direction of the image pickup tube 11 and the longitudinal direction of the stripes of the color stripe filter 11a are perfectly parallel to each other. For this reason, no problems occur. However, in actual practice, the scanning direction (that is, the direction of the scanning lines L) and the longitudinal direction of the stripes are not perfectly parallel to each other but are slightly deviated as shown in FIG. 7A due to deflection rotation, distortion and the like. As a result, the following problems occur. In FIG. 7A and FIG. 7B which will be described later, the inclination of the scanning direction with respect to the longitudinal direction of the stripes is shown exaggeratedly for convenience' sake.

Figures 8A, 8B:
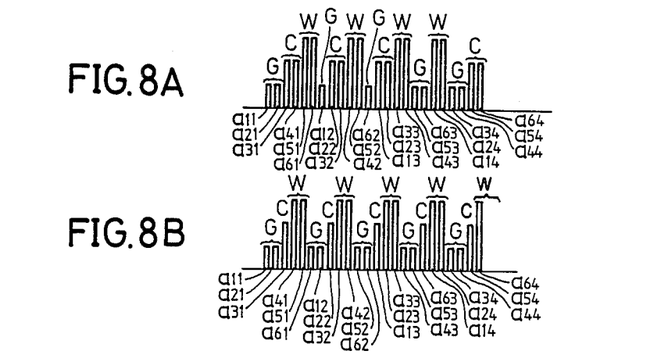
FIGS. 8A and 8B respectively show input signal waveforms to the color demodulating circuit obtained by the sampling shown in FIGS. 7A and 7B.

In other words, there occurs a case where the data related to the white (or transparent) information at the sampling point a14 is readout after the data related to the green information at the sampling point a63, and the data related to the cyan information is not read out. In this case, there is a problem in that it is impossible to accurately reproduce the waveforms of the green, cyan and white (or transparent) information, as may be seen from FIG. 8A. When the modulation degree of the image pickup tube is infinity (that is, the beam spot is infinitely small), the period of the waveforms of the green, cyan and white information become different from their original values. On the other hand, when the modulation degree of the image pickup tube is finite (that is, the beam spot is finite), it is impossible to discriminate whether the data at a sampling point such as the sampling point a23 which is at a border of the C and W stripes is related to the cyan or white information. When the scanning direction is slightly deviated from the longitudinal direction of the stripes, the problems described above do not occur just at one position but occur at various positions.

Hence, in the first embodiment of the invention, the memory 14a is designed so that the data are sampled in the scanning direction and are written into the memory 14a in the sequence of the sampled data at the sampling points a11, a12, a13, a14, . . . , a21, a22, a23, a24, . . . , a31, a32, . . . with the sampling positions shifted by 1/6 of a sampling period T for each scanning line as shown in FIG. 7B. It should be noted that only the main sampling points are shown in FIGS. 7A and 7B for convenience' sake. The stored sampled data are read out from the memory 14a in the sequence of the sampled data at the sampling points a11, a21, a31, a41, a51, a61, a12, a22, a32, . . . , that is, in the sequence of the sampled data arranged in the vertical direction. The memory 14b is designed similarly to the memory 14a.

According to the present embodiment, it is possible to sample all of the green, cyan and white information. Thus, it is possible to continuously and accurately reproduce the waveforms of the green, cyan and white information as may be seen from FIG. 8B. It is of course possible to accurately reproduce the waveforms of the green, cyan and white information even when the direction of the scanning lines L and the longitudinal direction of the stripes are perfectly parallel to each other.

In the present embodiment, the color stripe filter 11a comprises 240 stripe groups (corresponding to one field of the NTSC system). When it is assumed that the vertical resolution for one stripe group is two television scanning lines, the vertical resolution as a whole is 480 television scanning lines, and the vertical resolution is the same as that of the conventional image pickup device.

In the case where the image pickup tube is designed to scan in the vertical direction, the color stripe filter should be arranged so that the longitudinal direction of the stripes of the color stripe filter coincides with the vertical direction. In this case, the write-in to the memories 14a and 14b is performed in a sequence of the data arranged in the vertical direction and the read-out from the memories 14a and 14b is performed in a direction perpendicular to the write-in direction, that is, in the horizontal direction.

Furthermore, according to the present embodiment, the color multiplexed signal is obtained for each of the stripe groups arranged in the direction approximately perpendicular to the scanning direction. For this reason, the sampled data can be written into and read out from the memories for every one horizontal scanning period of the NTSC system, and it is unnecessary to provide special means for dividing the sampled data read out from the memories into a data group for every one horizontal scanning period. Consequently, the memory capacities of the memories do not need to be extremely large. In addition, since the color multiplexed signal is obtained with the sampling positions shifted in the scanning direction for each scanning line, it is possible to continuously reproduce the color multiplexed signal waveform even when the scanning direction and the longitudinal direction of the stripes are not perfectly parallel to each other.

Figure 9A:
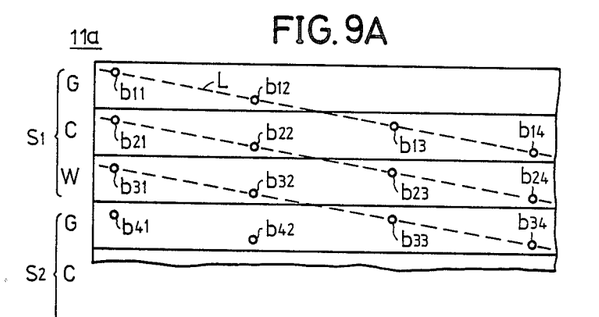
FIGS. 9A and 9B generally show a portion of the color stripe filter used in the second embodiment for explaining a relationship between the scanning lines and the sampling positions.
Figure 9B:
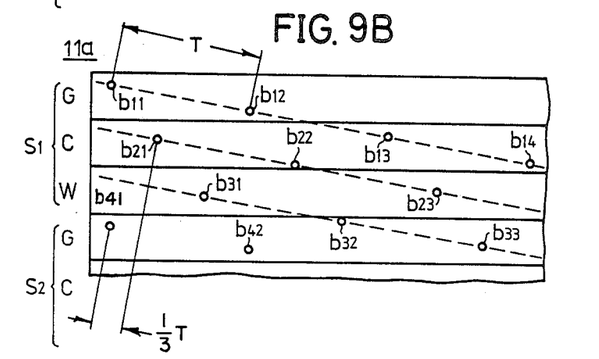

FIGS. 9A and 9B show a portion of the color stripe filter used in the second embodiment for explaining the relationship between the scanning lines and the sampling positions. As shown in FIG. 9A, the present embodiment is designed to perform the scanning in a direction inclined by a predetermined angle with respect to the longitudinal direction of the G, C and W stripes of the color stripe filter 11a. In FIG. 9A and FIG. 9B which will be described later, the inclination of the scanning direction with respect to the longitudinal direction of the stripes is shown exaggeratedly for convenience' sake. The relative positions of two mutually adjacent sampling points on the scanning line are such that the two mutually adjacent sampling points are deviated in the direction perpendicular to the longitudinal direction of the stripes by ½ the repetition pitch of the scanning lines. There are three scanning lines L per one stripe group consisting of the G, C and W stripes. In other words, a sampling point b12 is arranged in the middle of sampling points b11 and b21 along the direction perpendicular to the longitudinal direction of the stripes (that is, along a direction approximately perpendicular to the scanning direction). A sampling point b13 is arranged in the middle of sampling points b12 and b22 along the direction approximately perpendicular to the scanning direction, and other sampling points are arranged with similar relationships.

In FIG. 1, the signal obtained from the image pickup tube 11 which is provided with the color stripe filter 11a shown in FIG. 9A is passed through the preamplifier 12 and is supplied to the A/D converter 13 wherein the signal is converted into a digital signal. The output digital signal of the A/D converter 13 is supplied to the memories 14a and 14b. A control signal is supplied to the memories 14a and 14b from the switching circuit 15 so as to control write-in and read-out operations of the memories 14a and 14b.

Figure 10A:
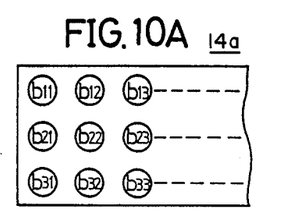
FIGS. 10A and 10B are diagrams for explaining a write-in operation to the memory in the second embodiment.
Figure 10B:
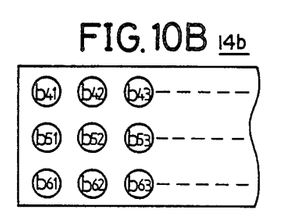

One period of the stripe groups of the color stripe filter 11a is set to correspond to one horizontal scanning period of the NTSC system. In a first horizontal scanning period, a signal from the A/D converter 13 related to the first stripe group S1 is written into the memory 14a as shown in FIG. 10A in a sequence of sampled data at sampling points b11, b12, b13, . . . , b21, b22, b23, . . . , b31, b32, b33, . . . shown in FIG. 9A. In a second horizontal scanning period, the stored sampled data related to the first stripe group S1 are successively read out from the memory 14a in a sequence of the sampled data at the sampling points b11, b12, b21, b22, b31, b32, b12, b13, b22, b23, b32, b33, b13, b14, b23, b24, b33, b34, . . . . In other words, the sampled data at the two mutually adjacent sampling points along the scanning direction and the sampled data at three adjacent sampling points along the direction approximately perpendicular to the scanning direction are taken as a group of six sampled data, and the sampled data at the sampling points which are adjacent to each other along the scanning direction and along the direction approximately perpendicular to the scanning direction are alternately read out from the memory 14a for each of such groups of six sampled data. On the other hand, in the second horizontal scanning period, a signal from the A/D converter 13 related to the second stripe group S2 is written into the memory 14b as shown in FIG. 10B in a sequence of the sampled data at sampling points b41, b42, b43, . . . , b51, b52, b53, . . . , b61, b62, b63, . . . , similarly as in the case of the write-in to the memory 14a in the first horizontal scanning period.

In a third horizontal scanning period, the stored sampled data related to the second stripe group S2 are successively read out from the memory 14b in a sequence of the sampled data at the sampling points b41, b42, b51, b52, b61, b62, . . . . Furthermore, in this third horizontal scanning period, a signal from the A/D converter 13 related to a third stripe group is newly written into the memory 14a.

Similarly thereafter, the write-in and read-out operations are alternately performed in the memories 14a and 14b for the signal related to each stripe group, and such operations are repeated. As a result, the write-in and read-out operations are performed for each stripe group, that is, for each horizontal scanning period. The signals read out from the memories 14a and 14b for every one horizontal scanning period of the NTSC system are supplied to the D/A converter 16 wherein the signals are converted into an analog signal.

Since the adjacent sampling points are arranged as described heretofore in the present embodiment, the result obtained is equivalent to the case where substantially two scanning lines exist in the direction approximately perpendicular to the scanning direction for each filter stripe (that is, equivalent to the case where substantially six scanning lines exist for each stripe group consisting of the G, C and W stripes) when the sampled data in each of the groups of six sampled data are alternately read out from the memory as described before. The output signal of the D/A converter 16 is similar to the color multiplexed signal obtained in accordance with the general energy step system. According to the energy step system, the fundamental wave component and the second harmonic component are to be reproduced. Hence, in the present embodiment, it may be understood from the sampling theorem that it is possible to reproduce the fundamental wave component and the second harmonic component can be reproduced when there are four or more scanning lines in one stripe group.

Figure 11:
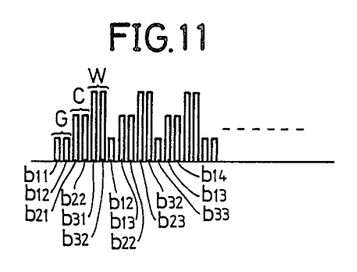
FIG. 11 shows an input signal waveform to the color demodulating circuit in the second embodiment of the color image pickup device according to the present invention.

The output signal of the D/A converter 16 comprises the information of the groups of six sampled data for each stripe group arranged on the time base as shown in FIG. 11. In this case, as shown in FIG. 11, the green information can only be sampled once, at the sampling points b12 and b33, in the second and third groups of six sampled data following the first group of six sampled data. However, when the sampling theorem is satisfied, the output signal of the D/A converter 16 is similar to the color multiplexed signal obtained by multiplexing the color components according to the energy step system, and it is possible to reproduce the fundamental wave component and the second harmonic component signal with a high fidelity even when the sampling phase and frequency change.

On the other hand, the memory 14a may be designed so that the data are sampled in the scanning direction and are written into the memory 14a with the sampling positions shifted by ½ the sampling period T for each scanning line as shown in FIG. 9B. It should be noted that only the main sampling points are shown in FIGS. 9A and 9B for convenience' sake. In this case, the memory 14b may be designed similarly to the memory 14a. In this case, the effects obtained are the same as those obtained by the arrangement shown in FIG. 9A.

Figure 12:
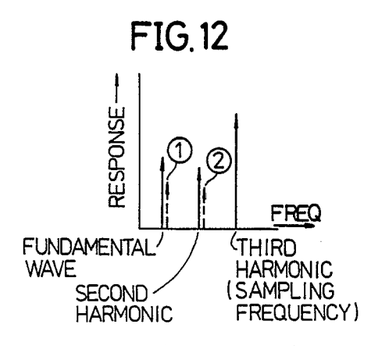
FIG. 12 shows a response for explaining aliasing distortions introduced by the sampling.
Figure 13:
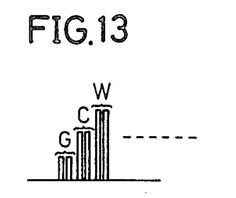
FIG. 13 shows an input signal waveform to the color demodulating circuit in another embodiment of the color image pickup device according to the present invention.

Next, description will be given with respect to the aliasing distortion caused by the fundamental wave component of the color stripe filter 11a and the sampling and the aliasing distortion caused by the higher harmonic component and the sampling. The fundamental wave component and the higher harmonic component of the color stripe filter 11a are shown in FIG. 12. When three samples are taken for one stripe group consisting of the G, C and W stripes at one time, an aliasing distortion (side band) ① of the sampling frequency and the second harmonic component occurs in the vicinity of the fundamental wave component, and an aliasing distortion ② of the sampling frequency and the fundamental wave component occurs in the vicinity of the second harmonic component. As a result, the color beat is generated.

For example, in FIG. 9A, each sampling point is in the middle of two sampling points adjacent thereto.

Hence, the sampling phase of a group (A) consisting of the sampling points b11, b21 and b31 and the sampling phase of a group (B) consisting of the sampling points b12, b22 and b32 are shifted by 180° with respect to the color stripe filter 11a. This means that the aliasing distortions (1) and (2) shown in FIG. 12 in the group (A) have polarities opposite those in the group (B). Therefore, when the sampling is performed as in the present embodiment, the aliasing distortions in the group (A) and the aliasing distortions in the group (B) will cancel each other, and the color beat will not be generated.

The interval between two mutually adjacent sampling points on the scanning line along the direction approximately perpendicular to the scanning direction is not limited to ½ the repetition pitch of the scanning lines. It is possible to reproduce the fundamental wave component and the second harmonic component even when the interval is set to a value smaller or greater than ½ the repetition pitch of the scanning lines.

Furthermore, since the scanning direction is inclined by the predetermined angle with respect to the longitudinal direction of the stripes of the color stripe filter so that the interval between two mutually adjacent sampling points on the scanning line along the direction approximately perpendicular to the scanning direction is within the repetition pitch of the scanning lines, the number of scanning lines required to obtain a specific resolution is smaller than the number conventionally required to obtain the specific resolution. Consequently, the frequency band of the video signal can be reduced. In addition, in the case where the interval between two mutually adjacent sampling points on the scanning line along the direction approximately perpendicular to the scanning direction is ½ the repetition pitch of the scanning lines, it is possible to cancel the aliasing distortions as described before, and the generation of the color beat can be effectively prevented.

Further, the present invention is not limited to these embodiments, but various variations and modifications may be made without departing from the scope of the present invention.

What is claimed is:

1. A color image pickup device comprising:
   an image pickup tube;
   a color stripe filter comprising a repetition of groups of stripes, said color stripe filter being arranged on said image pickup tube so that a longitudinal direction of the stripes of said color stripe filter is approximately parallel to a scanning direction of said image pickup tube, said pickup tube scanning said color stripe filter along m scanning lines for each group of stripes to produce color information;
   color multiplexed signal obtaining means for obtaining a color multiplexed signal, said multiplexed signal obtaining means comprising sampling means for sampling said color information at sampling positions with a sampling period T for each scanning line, analog-to-digital conversion means for subjecting a sampled color information to an analog-to-digital conversion, memory means for writing threrein an output signal of said analog-to-digital conversion means in a sequence of data arranged in said scanning direction and for reading out therefrom the stored signal in a sequence of data arranged in a direction substantially perpendicular to said scanning direction, and digital-to-analog conversion means for subjecting an output of said memory means to a digital-to-analog conversion to produce said color multiplexed signal; and
   color demodulating means for producing a color demodulated signal by subjecting said color multiplexed signal to a color demodulation,
   the sampling of the color information being performed so that the sampling points are shifted by T/m in the scanning direction for each scanning line, and the sampling period T being set to a time period such that said color multiplexed signal is produced to amount to four or more scanning lines for each group of stripes.

2. A color image pickup device as claimed in claim 1 in which each of said group of stripes is constituted by a green stripe, a cyan stripe and a transparent stripe.

3. A color image pickup device as claimed in claim 1 in which said sampling means samples the color information with the sampling points shifted by T/6 in said scanning direction for each scanning line.

4. A color image device as claimed in claim 1 in which said memory means comprises a field memory.

* * * * *